United States Patent
Hauser et al.

(10) Patent No.: US 8,359,853 B1
(45) Date of Patent: Jan. 29, 2013

(54) DRIVE APPARATUS HAVING A GEAR REDUCTION

(75) Inventors: Raymond Hauser, Sullivan, IL (US); Ryan S. Buescher, Neoga, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 76 days.

(21) Appl. No.: 12/978,108

(22) Filed: Dec. 23, 2010

Related U.S. Application Data

(63) Continuation of application No. 12/115,971, filed on May 6, 2008, now abandoned, which is a continuation of application No. 11/363,380, filed on Feb. 27, 2006, now Pat. No. 7,373,871.

(60) Provisional application No. 60/664,803, filed on Mar. 24, 2005, provisional application No. 60/657,762, filed on Mar. 1, 2005.

(51) Int. Cl.
*F16D 39/00* (2006.01)

(52) U.S. Cl. .......................... 60/487; 475/343

(58) Field of Classification Search ............... 60/487; 475/230, 343
See application file for complete search history.

(56) References Cited

U.S. PATENT DOCUMENTS

| | | |
|---|---|---|
| 2,608,261 A | 8/1952 | Blazier |
| 3,033,274 A | 5/1962 | Webb |
| 3,057,434 A | 10/1962 | Hanley |
| 4,610,605 A | 9/1986 | Hartley |
| 4,860,540 A | 8/1989 | Hayashi et al. |
| 5,201,692 A | 4/1993 | Johnson |
| 5,314,387 A | 5/1994 | Hauser |
| 5,423,182 A | 6/1995 | Hauser et al. |
| 5,664,465 A | 9/1997 | Okada et al. |
| 5,709,141 A | 1/1998 | Ohashi et al. |
| 5,819,537 A | 10/1998 | Okada et al. |
| 5,992,150 A * | 11/1999 | Eberle ............... 60/487 |
| 6,185,936 B1 | 2/2001 | Hauser et al. |
| 6,253,637 B1 | 7/2001 | Hauser et al. |
| 6,370,876 B1 | 4/2002 | Langenfeld |
| 6,374,604 B1 | 4/2002 | Poplawski et al. |
| 6,550,244 B1 | 4/2003 | Langenfeld |
| 6,672,058 B1 | 1/2004 | Langenfeld et al. |
| 6,676,294 B2 | 1/2004 | Harimoto et al. |
| 6,681,569 B1 | 1/2004 | Phanco et al. |
| 6,688,433 B1 | 2/2004 | Hauser et al. |
| 6,691,511 B1 | 2/2004 | Phanco et al. |
| 6,755,019 B1 | 6/2004 | Phanco |
| 6,840,042 B1 | 1/2005 | Taylor et al. |
| 6,849,179 B1 | 2/2005 | Taylor et al. |
| 6,880,334 B1 | 4/2005 | Phanco et al. |
| 7,040,092 B1 | 5/2006 | Buescher |
| 7,073,427 B2 | 7/2006 | Donders |
| 7,360,358 B1 | 4/2008 | Phanco et al. |
| 7,373,871 B1 | 5/2008 | Buescher |

* cited by examiner

*Primary Examiner* — F. Daniel Lopez

(74) *Attorney, Agent, or Firm* — Neal, Gerber & Eisenberg LLP

(57) ABSTRACT

A drive apparatus having a compact gear reduction is disclosed, where an output pinion gear is fixed on a motor shaft and drives a reduction gear train to provide power to a gear drive powering at least one axle shaft or a differential. The reduction gear set includes multiple reduction gears disposed between the output pinion gear and the axle or differential, and at least one of the plurality of reduction gears is rotatably disposed on the motor shaft. One of the plurality of reduction gears may be mounted on an axle shaft.

24 Claims, 19 Drawing Sheets

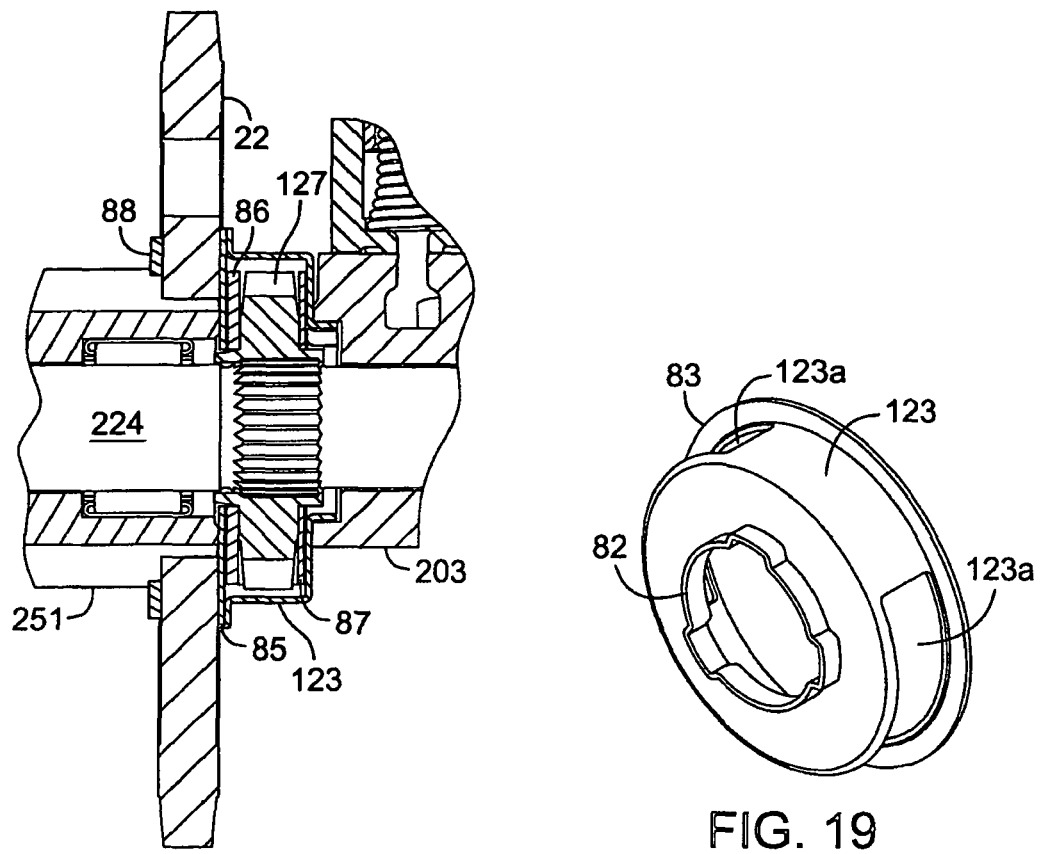
FIG. 18
FIG. 19
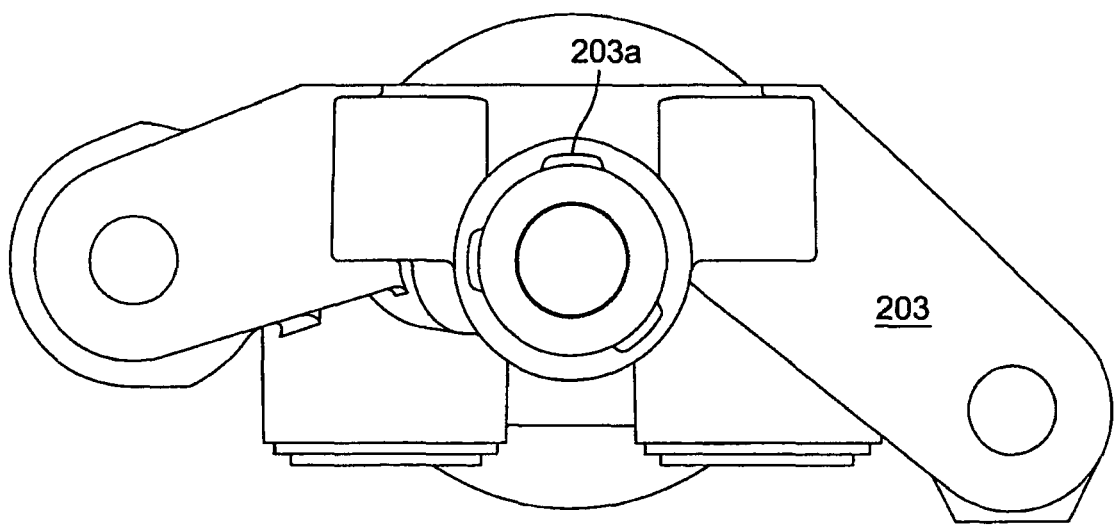
FIG. 20

DRIVE APPARATUS HAVING A GEAR REDUCTION

RELATED APPLICATIONS

This application is a continuation of U.S. patent application Ser. No. 12/115,971 filed on May 6, 2008, which is a continuation of U.S. patent application Ser. No. 11/363,380 filed on Feb. 27, 2006, which is now U.S. Pat. No. 7,373,871; which claims the priority of U.S. Provisional Application Ser. No. 60/657,762 filed on Mar. 1, 2005 and U.S. Provisional Application Ser. No. 60/664,803 filed Mar. 24, 2005. These prior applications are incorporated herein by reference in their entirety.

BACKGROUND OF THE INVENTION

This invention relates to a hydrostatic transaxle for use in vehicles, industrial applications or other applications.

SUMMARY OF THE INVENTION

A hydrostatic transaxle is disclosed herein. The various features and benefits of this transaxle provide a more compact and less expensive design than prior art models. Among the features disclosed herein are an improved internal brake mechanism, an improved gear arrangement and support structure for the gear train, an improved bypass mechanism, an improved pump swash plate design and an improved filter design. It will be understood that each of these improved features can be used in combination with other features disclosed herein or on their own.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

FIG. 18 is a cross-sectional view of an alternative embodiment of the spacer member shown in FIG. 17 and other components of the hydrostatic transmission.

FIG. 19 is a perspective view of the spacer member shown in FIG. 18.

FIG. 20 is an elevational view of a center section configured to mate with the spacer member shown in FIGS. 18 and 19.

DETAILED DESCRIPTION OF THE DRAWINGS

Figure 1:
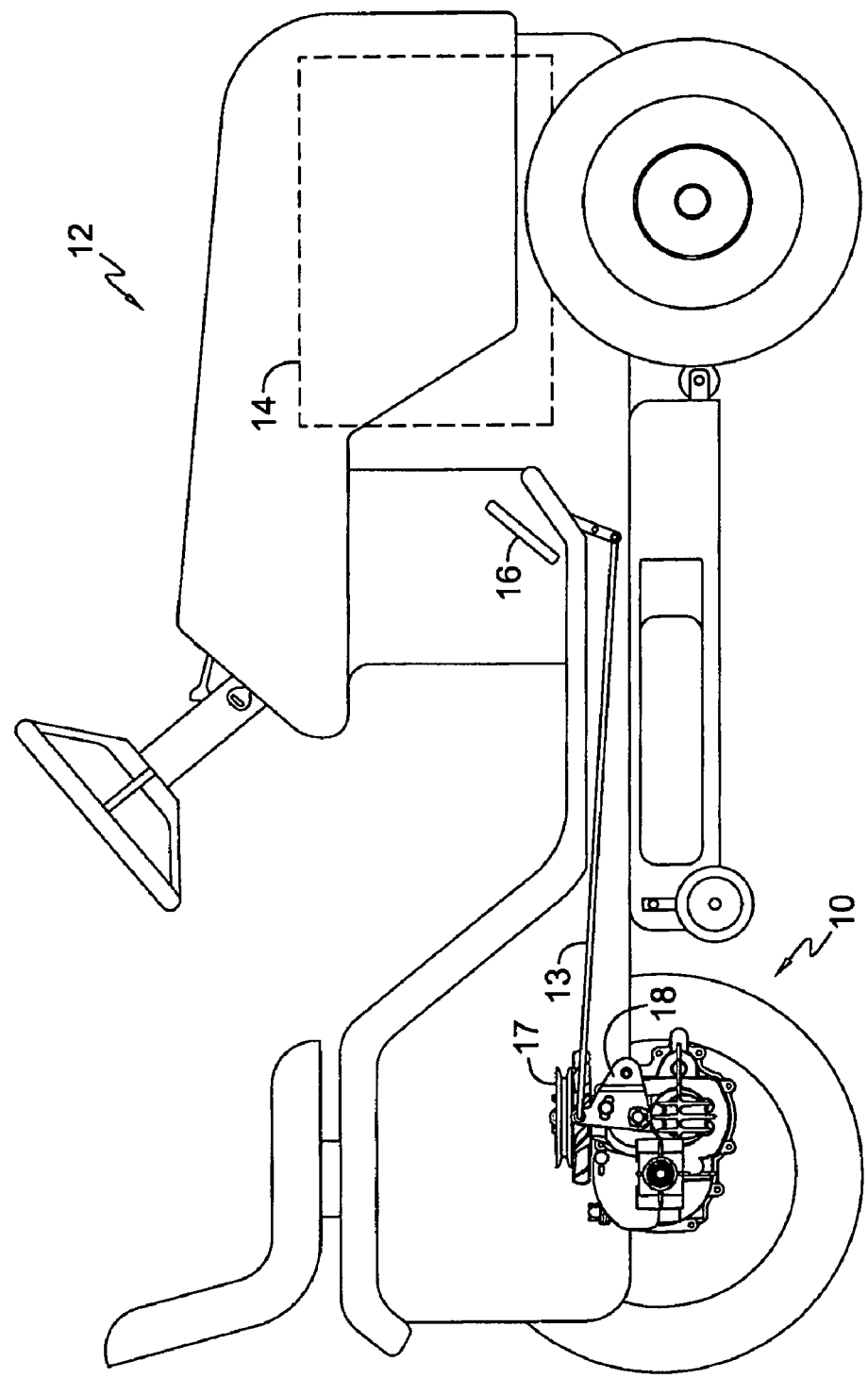
FIG. 1 is a side elevation view of an exemplary vehicle incorporating a transaxle in accordance with the present invention.
Figure 2:
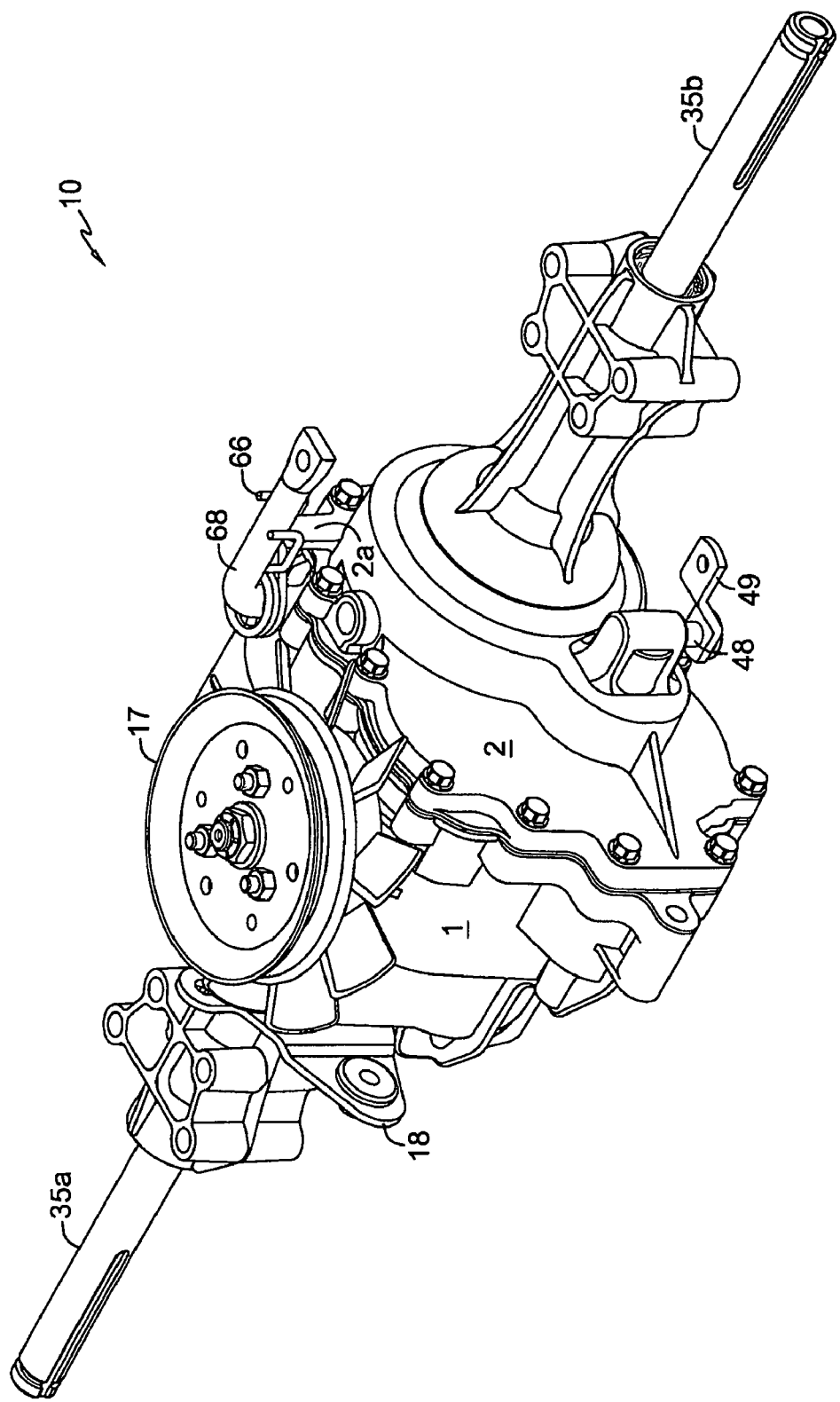
FIG. 2 is a perspective, external view of the transaxle in accordance with the present invention.
Figure 3:
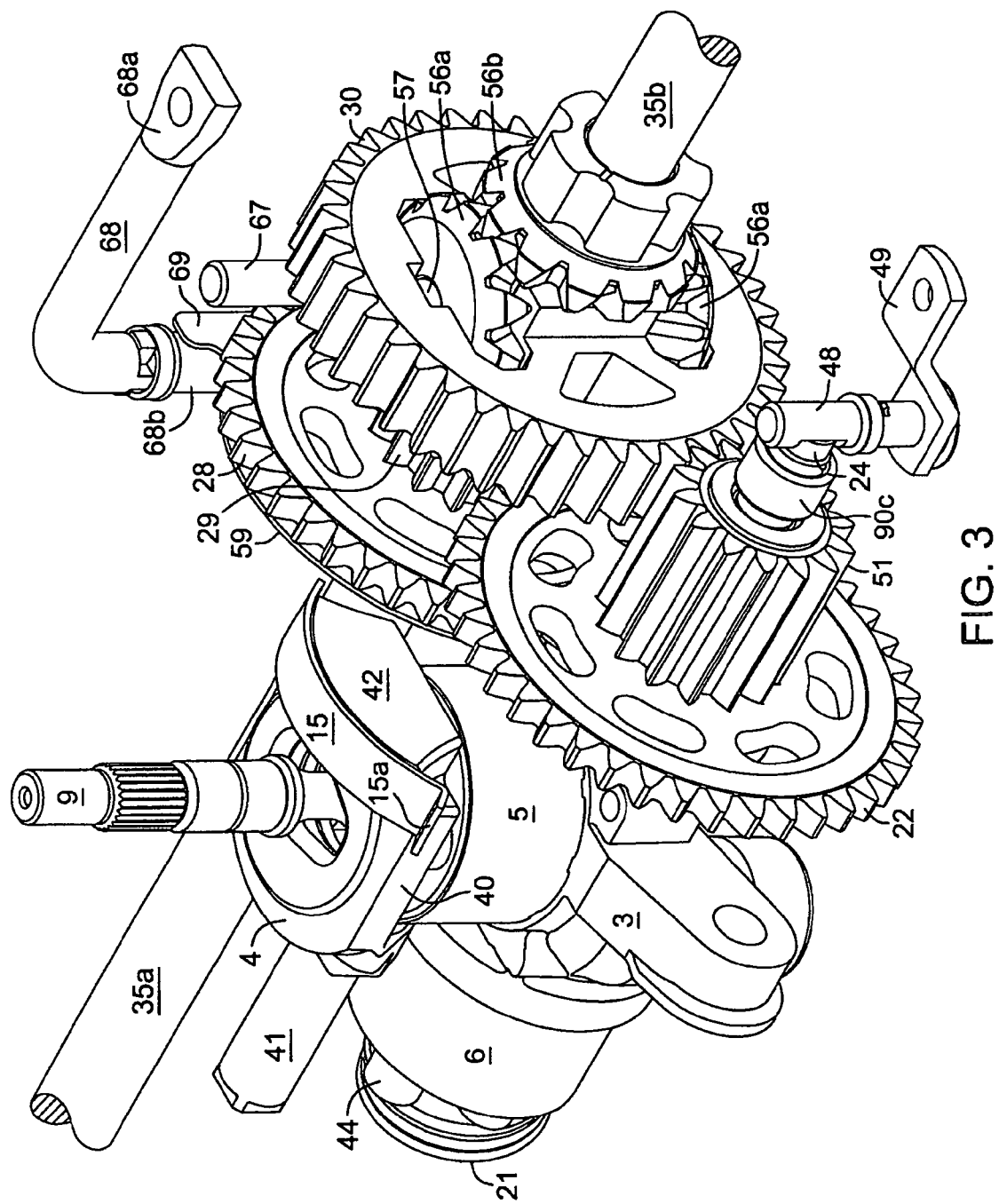
FIG. 3 is a perspective view of certain of the hydraulic and gearing components of the transaxle in accordance with the present invention.
Figure 4:
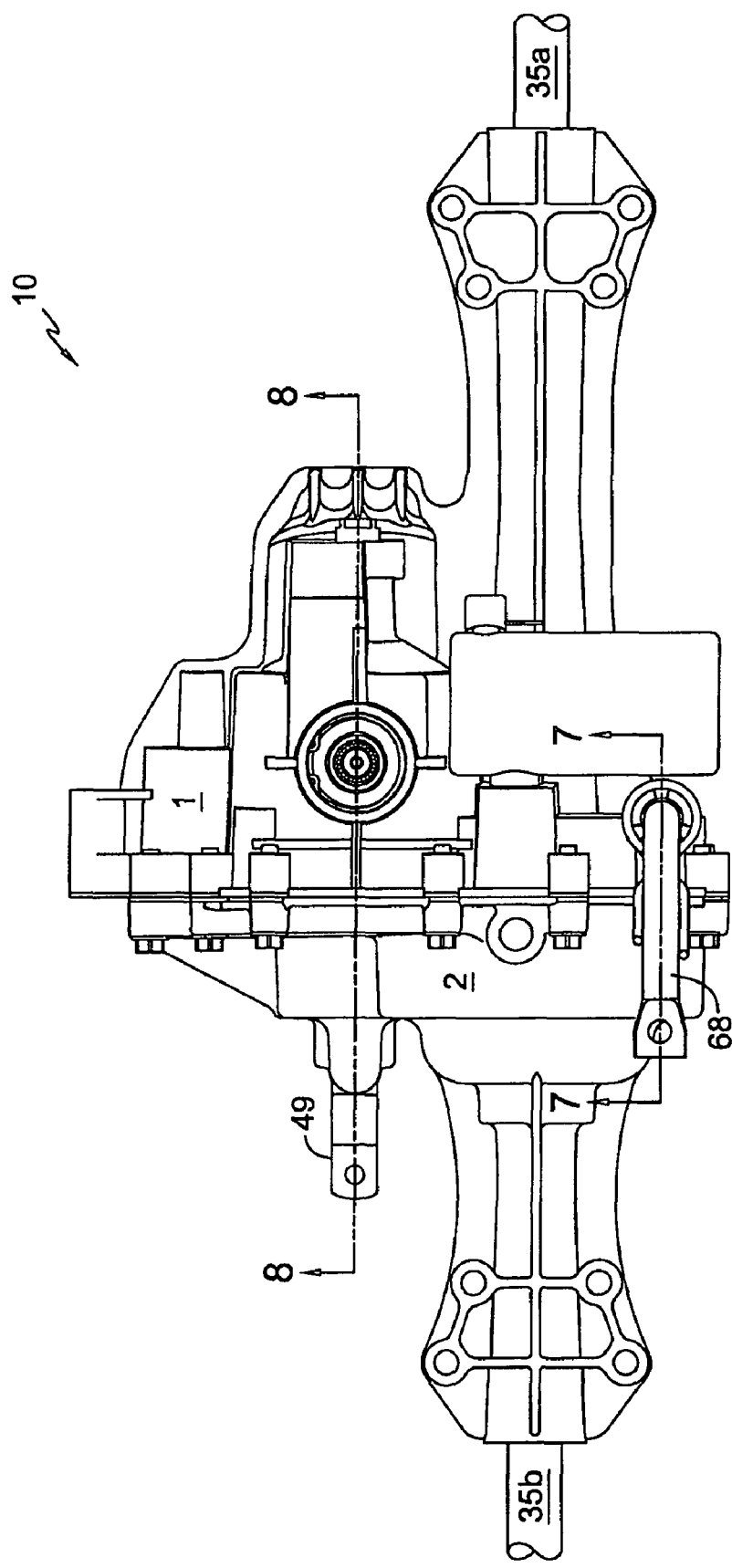
FIG. 4 is a top plan view of the transaxle shown in FIG. 2.

FIGS. 1, 2 and 3 depict a transaxle 10 used in connection with an exemplary application, namely vehicle 12, which is depicted herein as a riding tractor for use as a lawn mower or similar application. A linkage 13 is used to connect control arm 18 to pedal system 16. Other control mechanisms are known in the art. Prime mover 14 is also mounted on vehicle 12 and generally powers transaxle 10 through a belt (not shown) connected to pulley 17.

Figure 8:
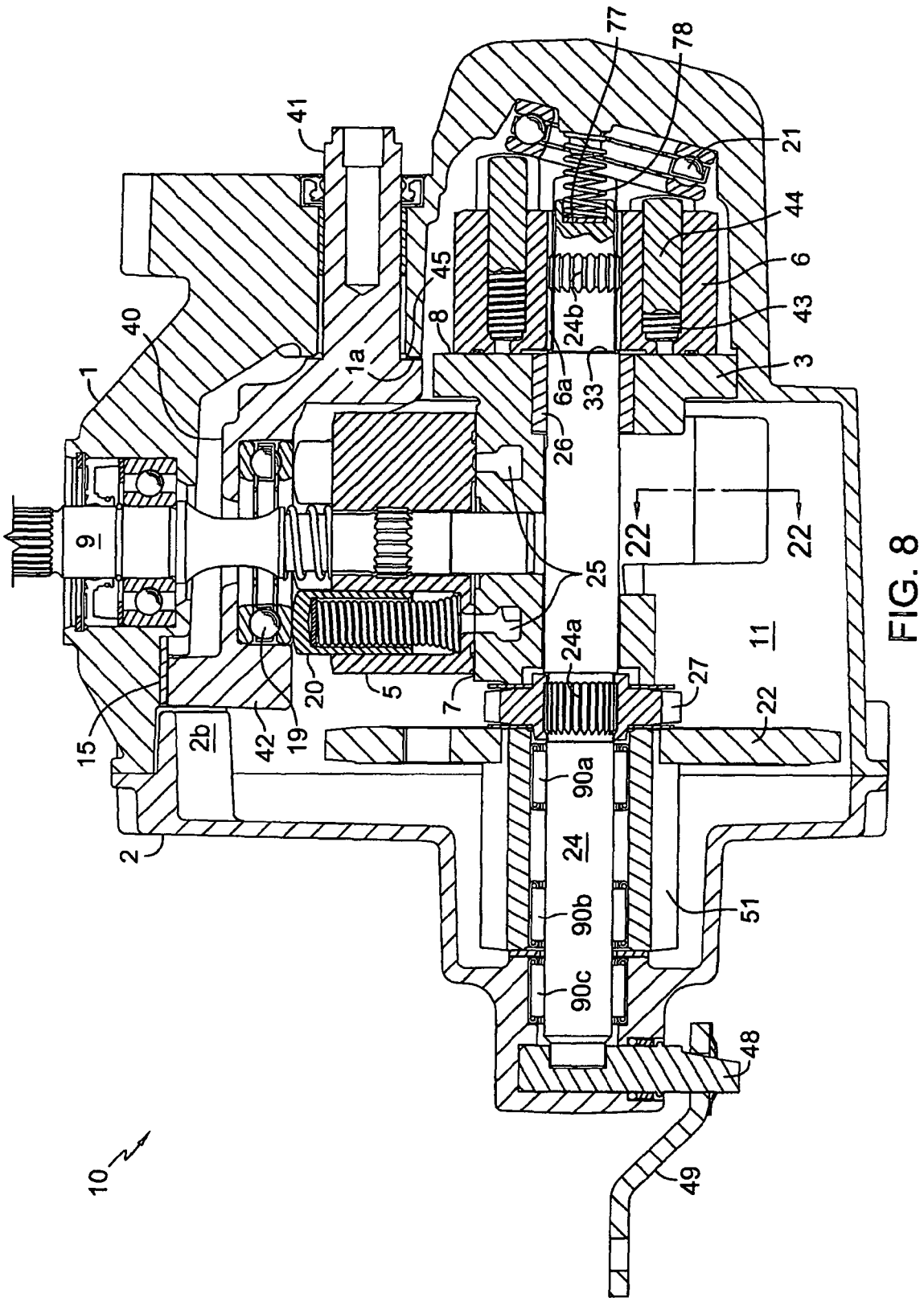
FIG. 8 is a cross-sectional view along the lines 8-8 of FIG. 4.

FIGS. 3 and 8 depict the internal workings of transaxle 10, which are similar in some ways to the transaxle depicted in commonly owned U.S. Pat. No. 6,253,637, the terms of which are incorporated herein by reference. In general, a pump cylinder block 5 is rotatably driven by pump input shaft 9 and is mounted on running surface 7 of center section 3. Motor cylinder block 6 is mounted on running surface 8 of center section 3 and connected to pump cylinder block 5 through hydraulic porting 25 in center section 3. These units are mounted inside a sump 11 formed inside two housing portions 1 and 2 joined along a vertical split line.

Various bearings, spacers, seals and similar items are depicted in the figures but not described in detail as the operation and assembly of such an integrated hydrostatic transaxle will be known to those of skill in the art. In addition, there are different embodiments described herein; to the extent there are identical or substantially identical structures used in these embodiments, identical numerals are used. Where structures are described between embodiments that vary from previous embodiments a prefix may be added to a previously described number. For example, item numbers 3, 103 and 203 all describe center sections of similar design.

Figure 5:
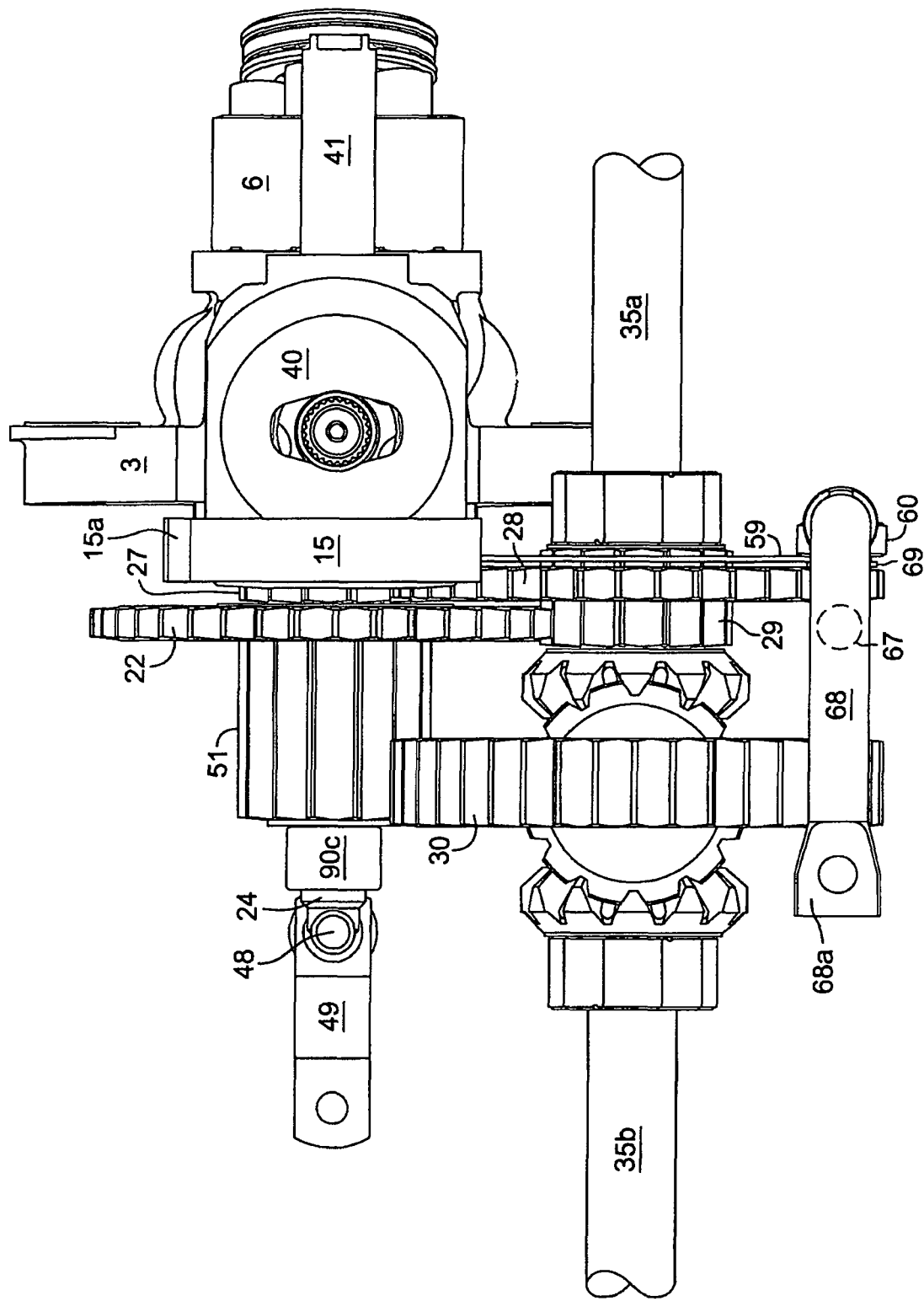
FIG. 5 is a top plan view of the hydraulic and gearing components shown in FIG. 3.

In prior designs, such as in U.S. Pat. No. 6,253,637, intermediate shafts are used to mount various gears in the gear train. In the present invention, on the other hand, the gear train is mounted on motor output shaft 24 and on or generally coaxial with axles 35a and 35b. This arrangement can be seen most clearly in FIGS. 3, 5 and 6, as the gear train consists of output gear 27, which is mounted on and driven by motor shaft 24, gears 22, 28, 29, 30 and 51 and bevel gears 56a and 56b of the differential. These gears will be described in more detail below.

Output gear 27 is splined on motor shaft 24 by means of splines 24a, as shown most clearly in FIG. 8. First stage pinion (output) gear 27 drives first stage gear 28 that includes an inner diameter gear form to engage and drive second stage pinion gear 29. Second stage gear 22 is preferably identical in construction to first stage gear 28 and also has an inner diameter gear form to engage and drive third stage pinion 51. Second stage gear 22 is driven by second stage pinion gear 29. Third stage pinion 51 is supported on needle bearings 90a and 90b on motor shaft 24. Motor shaft 24 extends through third stage pinion 51 and is supported on needle bearing 90c on an internal surface of housing 2. Third stage pinion 51 then provides the drive force to bull gear 30 to power the differential. The differential includes a plurality of bevel gears 56a and 56b. Bevel gears 56a are supported on pins 57 in radially oriented bores formed in unitary bull gear 30, as demonstrated in, e.g., U.S. Pat. No. 2,608,261.

Figure 6:
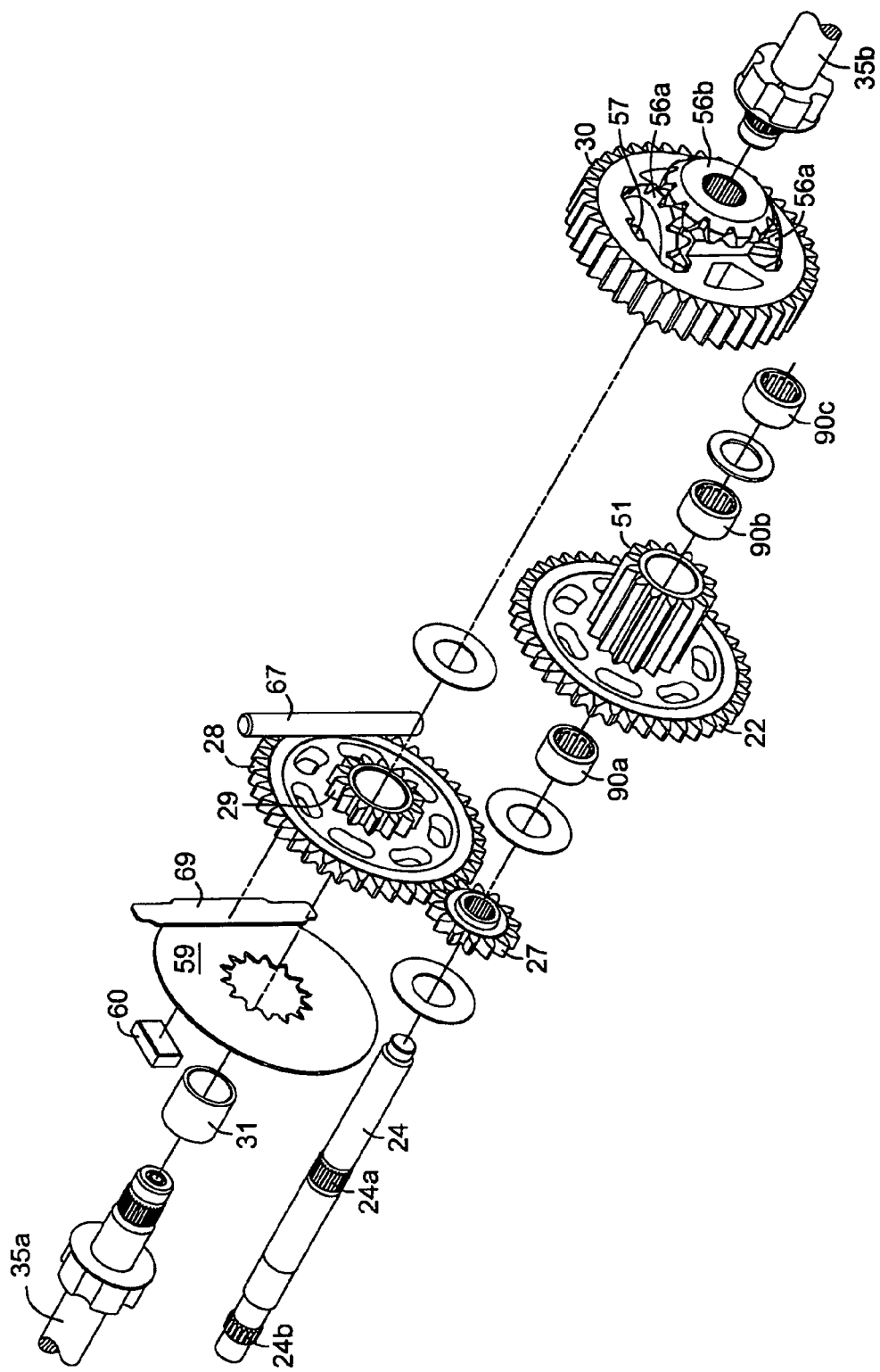
FIG. 6 is an exploded view of certain gearing and drive components of the transaxle shown in FIG. 2.

As can be seen in FIG. 6, gears 22 and 51 are mounted on motor output shaft 24, eliminating the need for an intermediate shaft or jack shaft. Similarly, gears 28 and 29 are journalled on axle 35a, again eliminating the need for an extra shaft. Gears 28 and 29 rotate in the same direction as axle shaft 35a, thus reducing the relative speed of these gears with respect to axle shaft 35a and decreasing the wear on bearing 31. Similarly, gears 22 and 51 rotate in the same direction as motor shaft 24, reducing the relative speed of these gears with respect to motor shaft 24 and decreasing the wear on bearings 90a and 90b.

Figure 16:
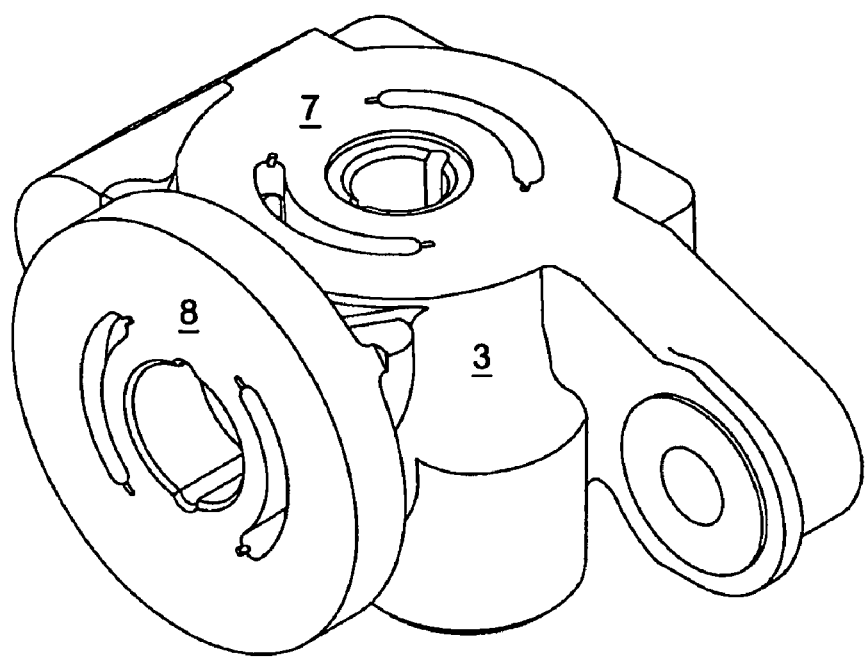
FIG. 16 is a perspective view of a center section for use in accordance with the embodiment of the present invention shown in FIG. 3.
Figure 17:
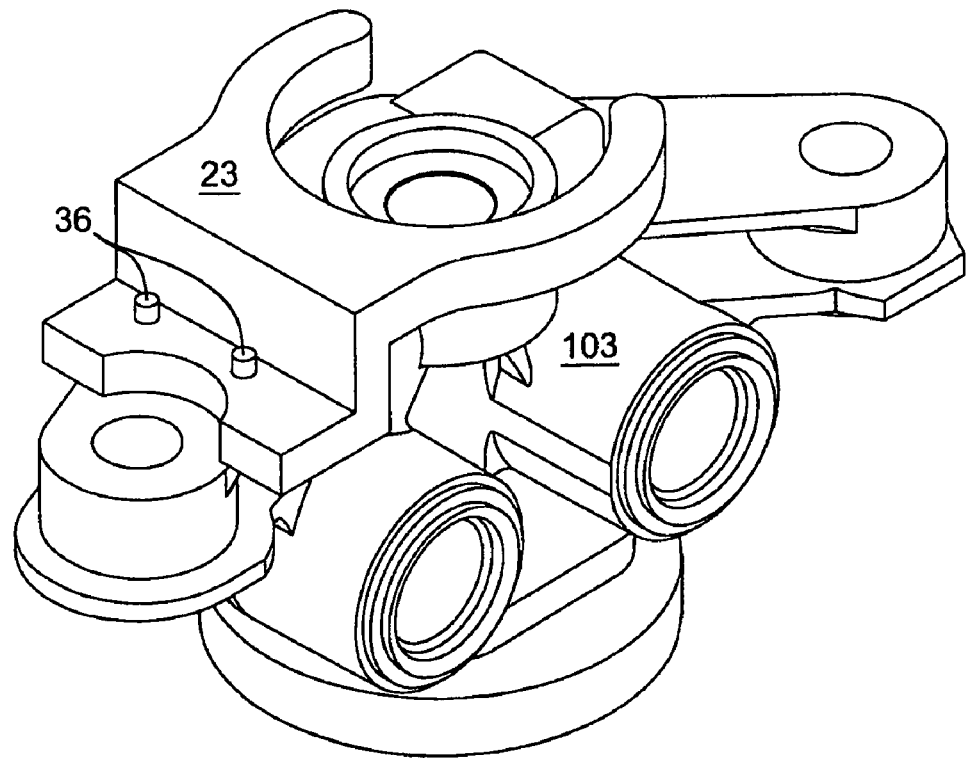
FIG. 17 is a bottom perspective view of a center section and spacer member in accordance with the embodiment of the present invention shown in FIG. 11.

Center section 3 of the present invention may be of the design shown in FIG. 16. In mounting output gear 27 on motor shaft 24, it may be necessary to limit the thrust of gear 22 against output gear 27 and center section 3 during operation of transaxle 10. In one embodiment of the invention, as shown in FIG. 17, a thrust spacer 23 is positioned on center section 103, preferably by dowel pins 36, in order to permit output gear 27 to rotate freely.

An alternative design of such a spacer unit is shown in FIGS. 18, 19 and 20, where spacer 123 is mounted to center section 203. Output gear 127 is located in an internal area formed by spacer 123, and openings 123a are formed in spacer 123 to permit oil flow into and out from the internal volume of spacer 123 and to provide an area for gear 127 to engage with first stage gear 28. Spacer 123 also comprises a first flange 82 and second flange 83. First flange 82 is shaped to fit within pockets 203a formed on center section 203 to prevent rotation of spacer 123 with respect to center section 203. A second flange 83 abuts against washer 85, and the various thrust loads of gears 22, 127 and 251 are absorbed by washers 85, 86, 87 and retaining ring 88.

When used in an application such as a vehicle, a closed circuit such as hydraulic porting 25 in center section 3 preferably includes a means for placing the hydraulic circuit into communication with sump 11 to make the vehicle easier to move when prime mover 14 is not engaged. A known bypass system includes the use of a puck to lift the motor block off the motor running surface of a center section, such as is shown in U.S. Pat. No. 5,314,387. When the block is lifted off the motor running surface, the hydraulic fluid is discharged to the sump from the closed circuit through the kidney ports on the motor running surface. Another known bypass mechanism lifts the two check balls off their respective check valve seats, such as is disclosed in U.S. Pat. No. 6,253,637.

The present invention provides an improved bypass method; in general terms, the motor shaft is movable along its axis in order to engage and lift the motor cylinder block off its running surface on the center section. Different embodiments of this design, including various means of both supporting the motor shaft and placing the unit into bypass in accordance with this invention are disclosed herein. Where appropriate, identical numerals in the figures represent identical or substantially identical structure.

First, with regard to the transaxle 210 embodiment disclosed in FIGS. 10-14, motor shaft 224 is supported by roller bearing 262 and friction bearing 290b through third stage pinion gear extension 251a and by friction bearing 26 in center section 103. Gear 251 is also supported on motor shaft 224 through needle bearing 290a. Motor shaft 224 includes splines 24b formed thereon to engage corresponding splines 6a on the inner surface of motor cylinder block 6. Splines 6a are formed to extend inside motor block 6 to the lower surface thereof that is mounted on motor running surface 8, so that splines 6a terminate adjacent motor running surface 8.

A bypass rod 248 has a first end that extends into an opening formed in housing 202 and a second end on which bypass arm 249 is mounted. Shoulder 252 on motor shaft 224 is positioned in cam opening 250 formed on rod 248. As bypass arm 249 is activated and the force of bias spring 257 is overcome, bypass rod 248 rotates from the position shown in FIG. 13 to the position shown in FIG. 14, moving motor shaft 224 in the direction toward motor cylinder block 6. A shoulder 33 on motor shaft 224 engages splines 6a at the bottom of cylinder block 6 to lift block 6 off running surface 8, thereby putting transaxle 10 into bypass by permitting oil to flow from the closed hydraulic circuit to sump 11. When bypass arm 249 and rod 248 are rotated back to the non-bypass position, transaxle 10 is taken out of bypass. During normal operation, tension of bypass spring 257 holds bypass arm 249 and bypass rod 248 in the non-bypass position. Engagement of shoulder 252 formed on motor shaft 224 in cam opening 250 limits axial movement of shaft 224, thereby preventing the bypass function from being activated. The contact between bypass rod 248 and shoulder 252 is kept as close as possible to a line through the centerline of bypass rod 248 that is parallel to the axis of motor shaft 224, which reduces the moment applied to bypass rod 248, reducing the force needed to keep the rod deactivated, and thus reducing the size of spring 257.

A slightly modified embodiment of a bypass mechanism is depicted in FIGS. 2, 3 and 8, where third stage pinion 51 is supported on needle bearings 90a and 90b on motor shaft 24, and motor shaft 24 is supported in housing 2 through a separate needle bearing 90c along with friction bearing 26 in center section 3. A slightly modified bypass arm 49 and bypass rod 48 are also provided to force motor shaft 24 to move towards motor cylinder block 6 to move it off running surface 8 as described above.

A return force is provided by helical compression spring 78 which is mounted on housing 1 and engaged to washer 77 adjacent to the end of motor shaft 24. A return force is also provided by the force of motor piston springs 43 in motor pistons 44 as pistons 44 engage fixed swash plate or thrust bearing 21. Finally, a spring similar to spring 257 shown in FIG. 10 may be mounted to bypass arm 49 and secured to a housing of transaxle 10 or to a bracket on the vehicle 12 to provide a return force to bypass arm 49.

Figure 9:
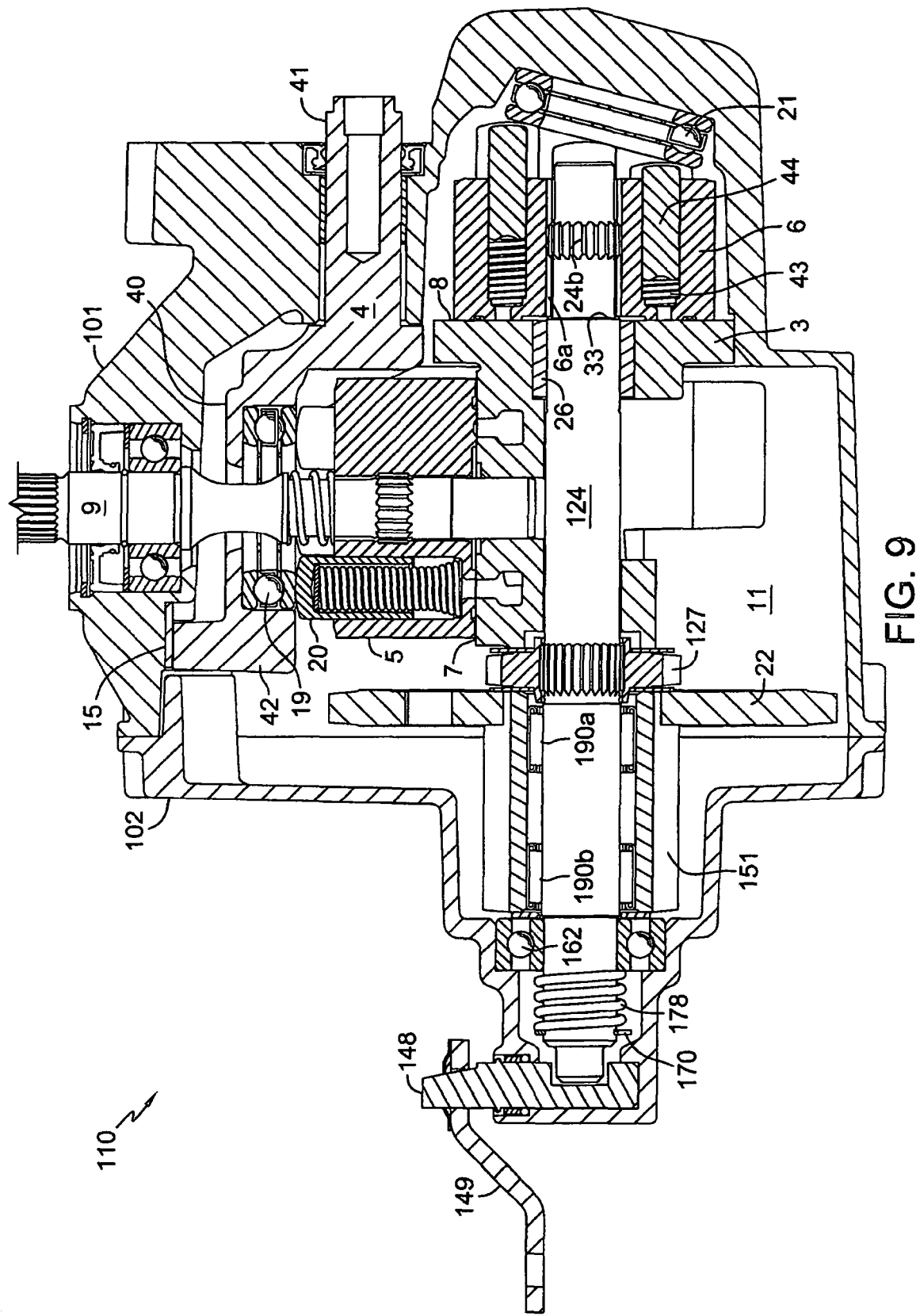
FIG. 9 is a cross-sectional view similar to FIG. 8 of an alternative embodiment of this invention.
Figure 10:
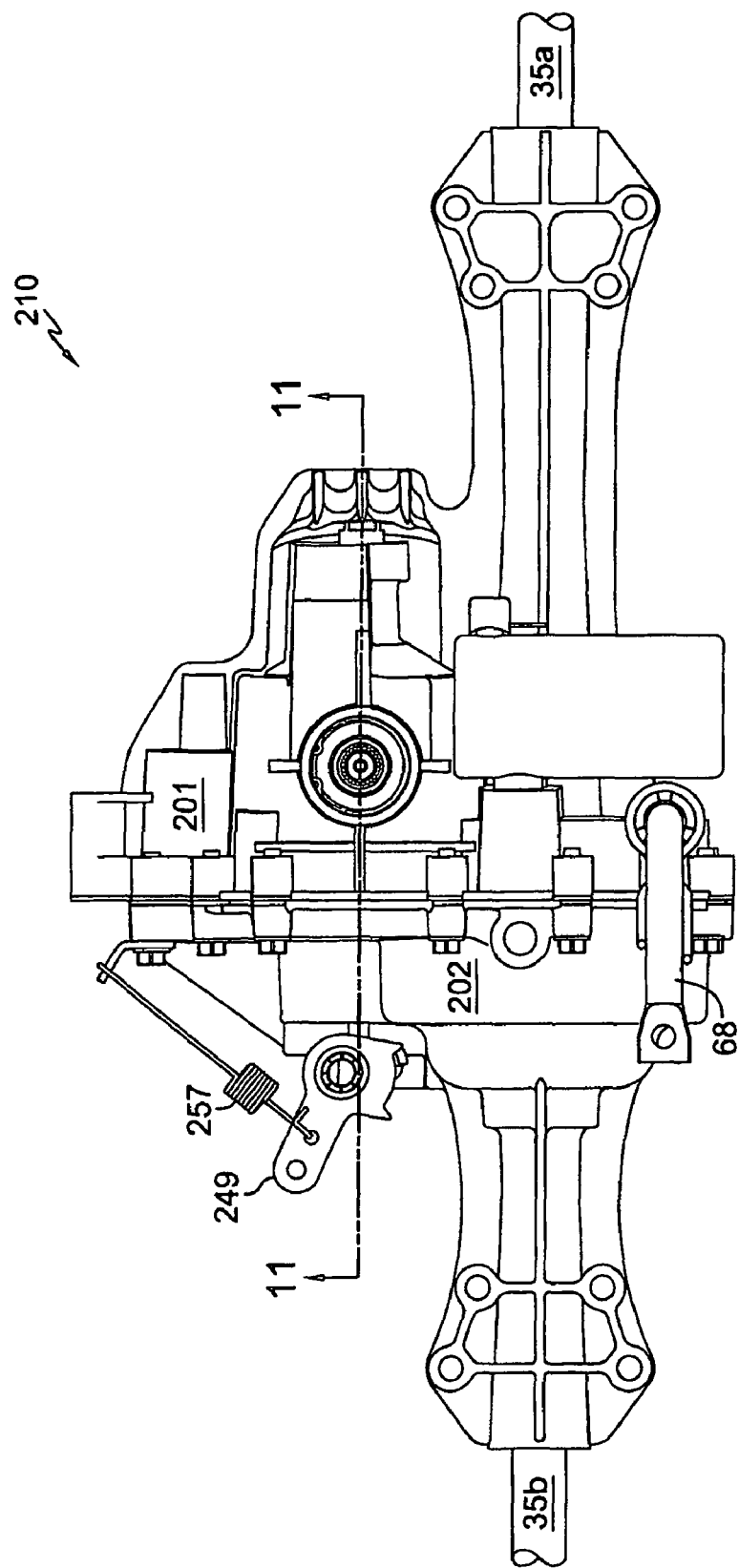
FIG. 10 is a top plan view of a transaxle incorporating an alternative embodiment of the motor shaft bypass feature of this invention.
Figure 11:
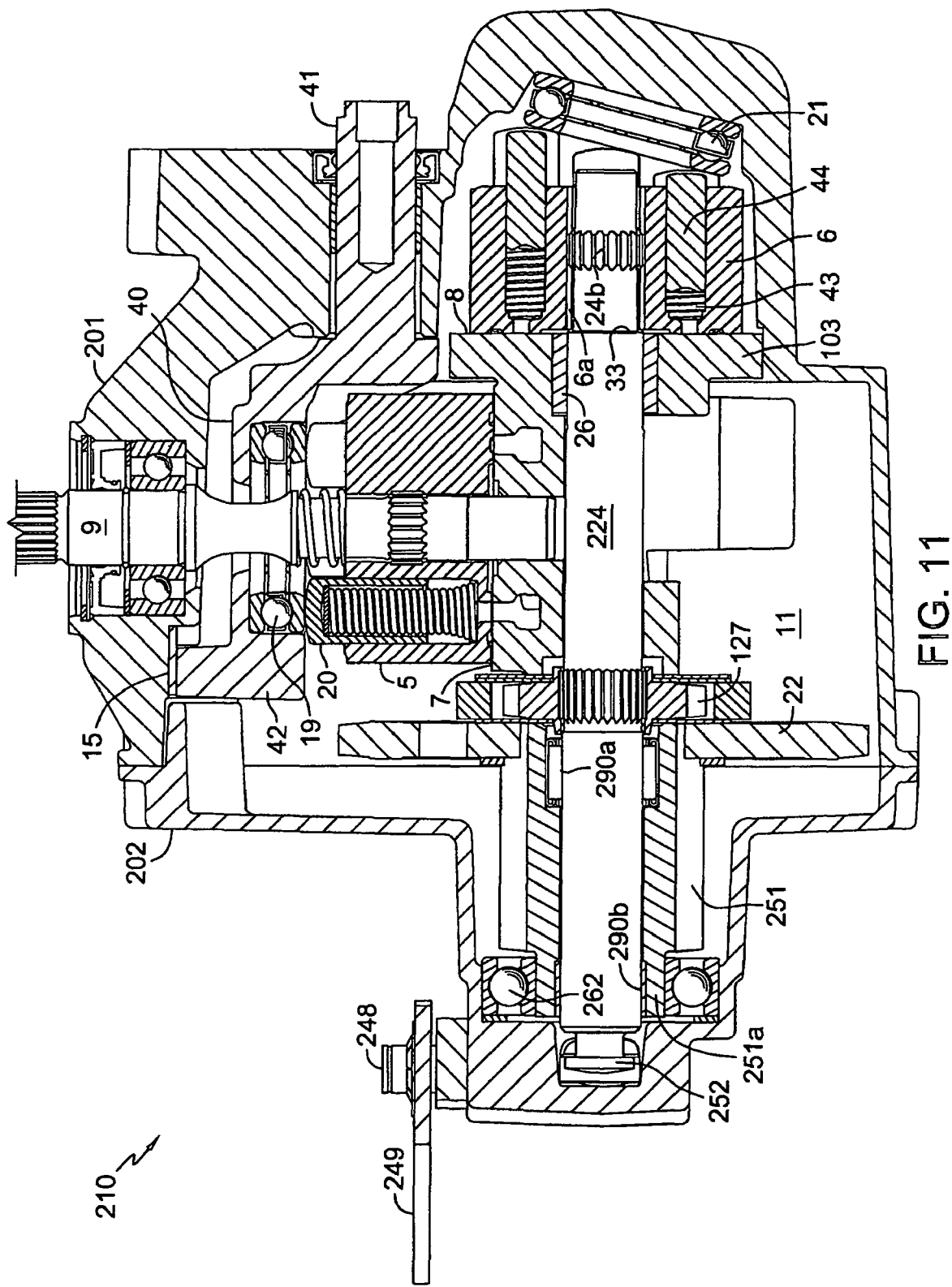
FIG. 11 is a cross-sectional view along the lines 11-11 of FIG. 10, with certain elements shown whole for clarity.
Figure 12:
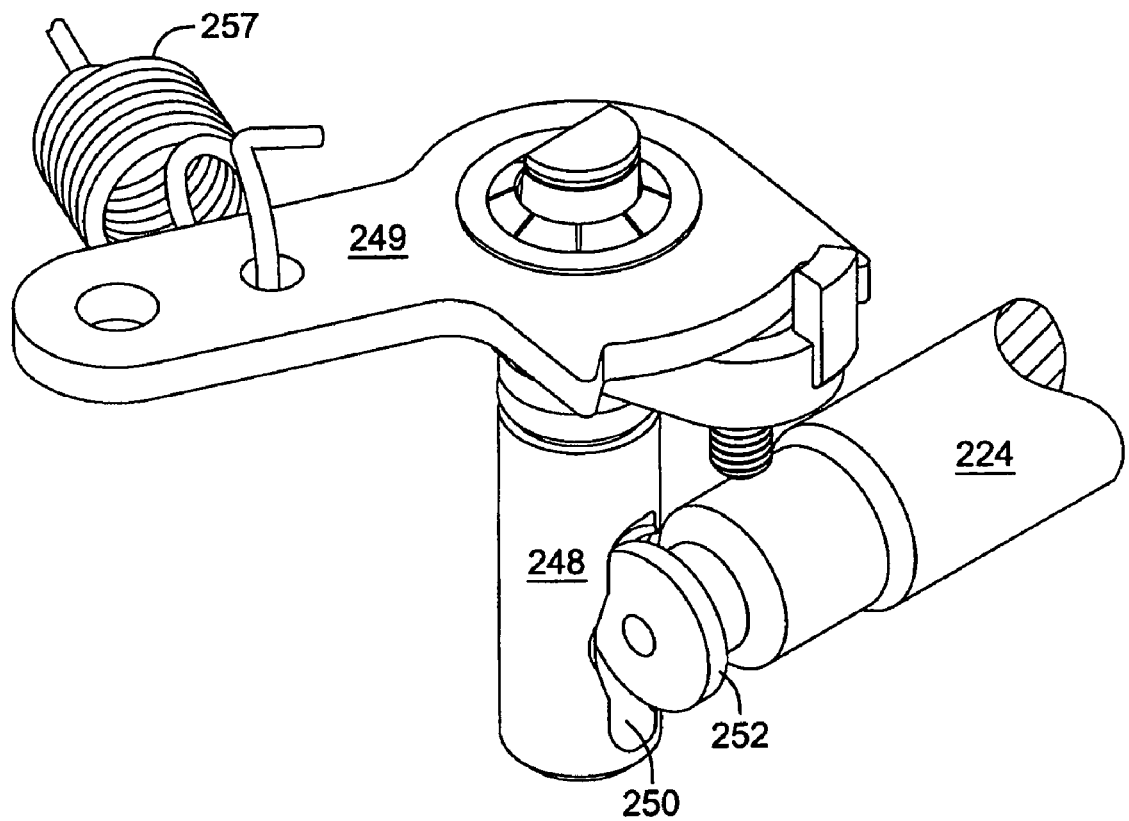
FIG. 12 is a perspective view of selected components of the motor shaft bypass mechanism shown in FIG. 11.
Figure 13:
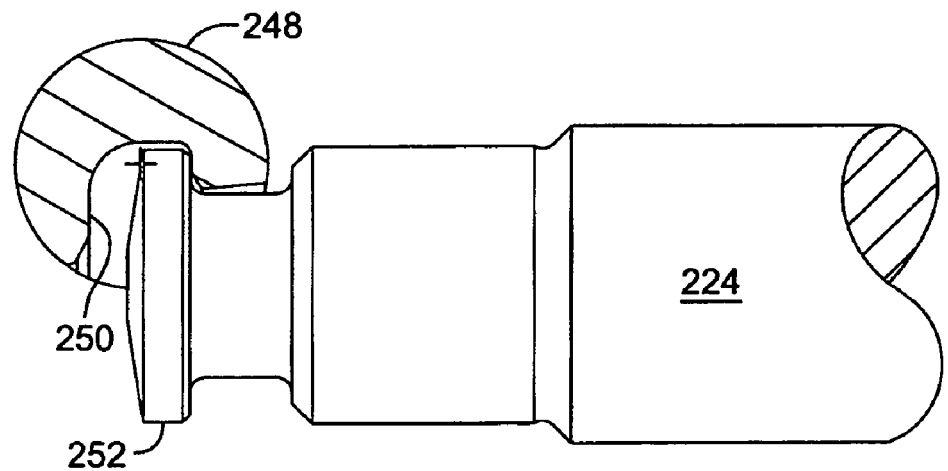
FIG. 13 is a partial sectional view of a portion of the motor shaft and bypass arm assembly of the embodiment depicted in FIG. 11, with the bypass in the deactivated position.
Figure 14:
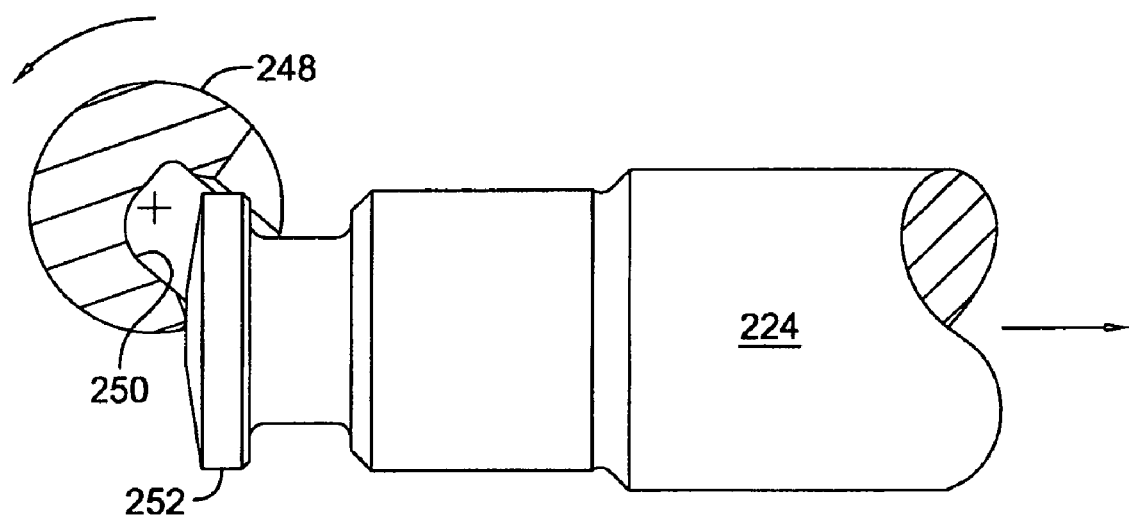
FIG. 14 is a view similar to FIG. 13, with the bypass in the activated position.
Figure 15:
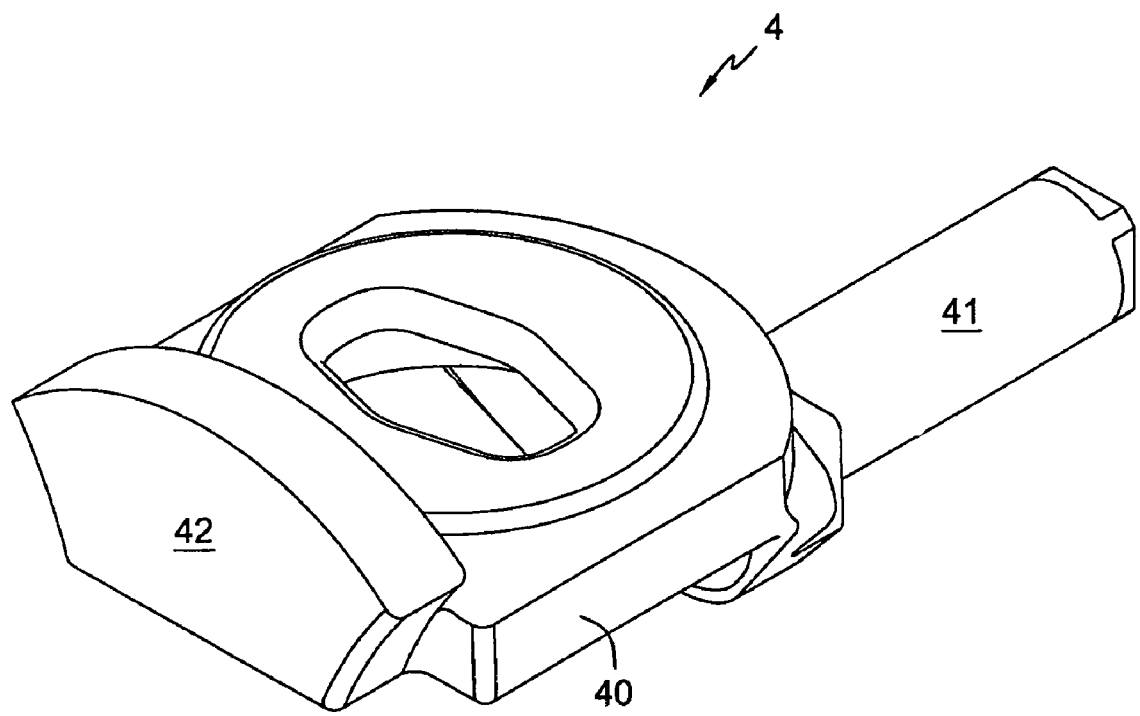
FIG. 15 is a perspective view of the swash plate in accordance with the present invention.

A further embodiment of a bypass mechanism is depicted in FIG. 9, where third stage pinion gear 151 is supported on needle bearings 190a and 190b on motor shaft 124, and motor shaft 124 is supported directly on housing 102 through ball bearing 162. A slightly modified bypass arm 149 and bypass rod 148 are also provided to force motor shaft 124 to move towards motor cylinder block 6 to move it off running surface 8 as described above. In this embodiment, there is no spring mounted adjacent thrust bearing 21; rather, retaining ring 170 engages return spring 178 at the opposite end of motor shaft 124 to force motor shaft 124 to return to the operative position and take transaxle 10 out of bypass.

Cradle mounted swash plates are known in the art and are disclosed, for example, in U.S. Pat. No. 5,201,692. There are certain disadvantages to cradle mounted swash plates, such as the change in control moments over the life of the cradle bearing. As control moments increase, it is more difficult to operate the swash plate, which is a disadvantage for foot controlled units.

Another design known in the art comprises a pair of trunnions located on opposite sides of the swash plate. Such designs, however, require the trunnions to extend out and be supported at both sides of the swash plate. In a vertically split housing such as the present design, this would require the trunnions to be supported in both housings 1 and 2. Prior art trunnion designs are also disadvantageous in that their control moments may be too low.

In one feature of the present design, swash plate 4 comprises a main body portion 40 in which the thrust bearing 19 is mounted for engaging the pump cylinder pistons 20, as shown, e.g., in FIGS. 3, 5, 8 and 15. Trunnion 41 extends from a first end of swash plate body 40. Trunnion 41 is supported in and extends outwardly from housing 1 to engage control arm 18. A cradle member 42 extends from the opposite side of swash plate body 40 and engages cradle bearing 15 mounted on an inner surface of housing 1. A pocket is formed by the interaction of housing members 1 and 2 adjacent cradle member 42 so that the entire swash plate 4 is supported inside housing member 1 and does not extend past the junction surface of housing members 1 and 2. More specifically, shoulder 45 formed adjacent to trunnion 41 is located by surface 1*a* formed in housing 1, and cradle member 42 is located by housing portion 2*b*. Using housing members 1 and 2 to create this pocket eliminates the need for extra ribs or other structure formed on the inside of the housing member to restrain cradle member 42. Cradle bearing 15 is prevented from moving rotationally by the engagement of protrusion 15*a* with slot 1*e* in housing 1. Cradle 15 is maintained in position laterally by housing 1 and housing portion 2*b*. While swash plate 4 is shown as being positioned entirely on one side of the junction surface of housing members 1 and 2, it need not be.

As shown most clearly in FIGS. 2, 5, 6 and 7, brake actuator arm 68 is generally L-shaped with an external horizontal portion 68*a* to which can be attached the appropriate control linkages or the like outside the transaxle housing, and a vertical member 68*b* extending into an opening formed in housing member 1. A return spring 66 is preferably also located about vertical portion 68*b*. Return spring 66 is positioned on castellated boss 65 formed as part of housing 1. Crenellations 65*a* minimize the material in boss 65 and also reduce the volume where water and debris may be trapped. Return spring 66 is located vertically by housing portion 1*f* on side of spring 66 and brake actuator arm 68 capturing spring portions 66*a* and 66*b* on the other side of spring 66. As will be described in more detail, brake actuator arm 68 is captured in the housing and thus serves to limit the vertical movement of spring 66. Spring portions 66*a* and 66*b* also extend past opposite side of boss 2*a*, and thus establish a nominal position for brake actuator arm 68, which is the deactivated position in the embodiment shown.

Figure 21:
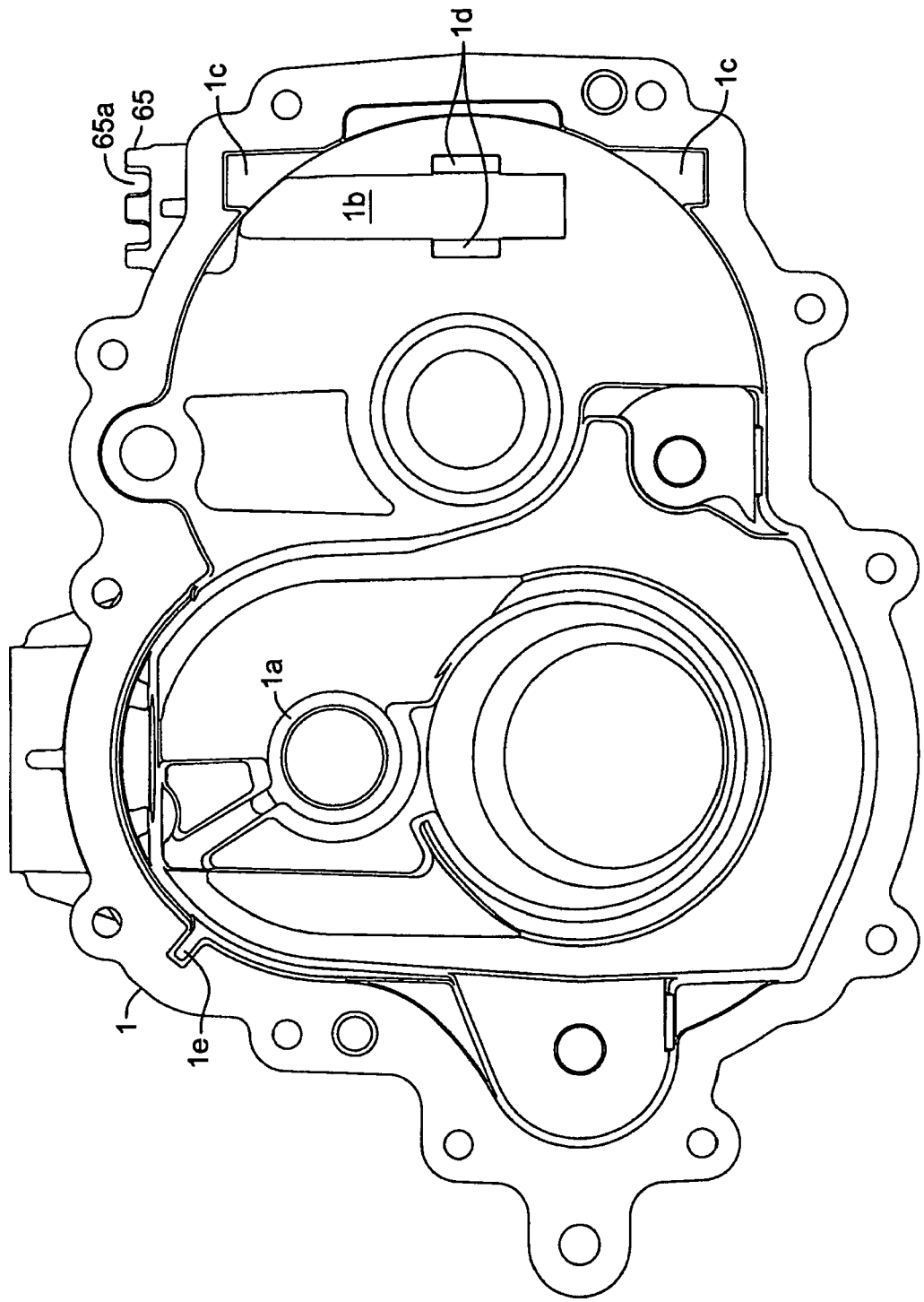
FIG. 21 is an interior view of the transaxle main housing.

The brake assembly also comprises brake rotor 59, brake stator 69, pin 67 and brake puck 60. Puck 60 is located in a cam pocket 68*c* formed in vertical portion 68*b* of brake arm 68. Pin 67 and stator 69 are preferably mounted in as-cast pocket 1*c* formed in housing member 1, as shown most clearly in FIG. 21. It can be seen in FIG. 7 that force applied to pin 67 will be absorbed by housing member 2. Puck 60 is also held in place in an as-cast pocket 1*d* in housing member 1 and by its proximity to rotor 60, stator 69, gear 28 and pin 67; thus puck 60 also acts to restrain movement of brake arm 68 to prevent it from being pulled out of the housing.

Figure 7:
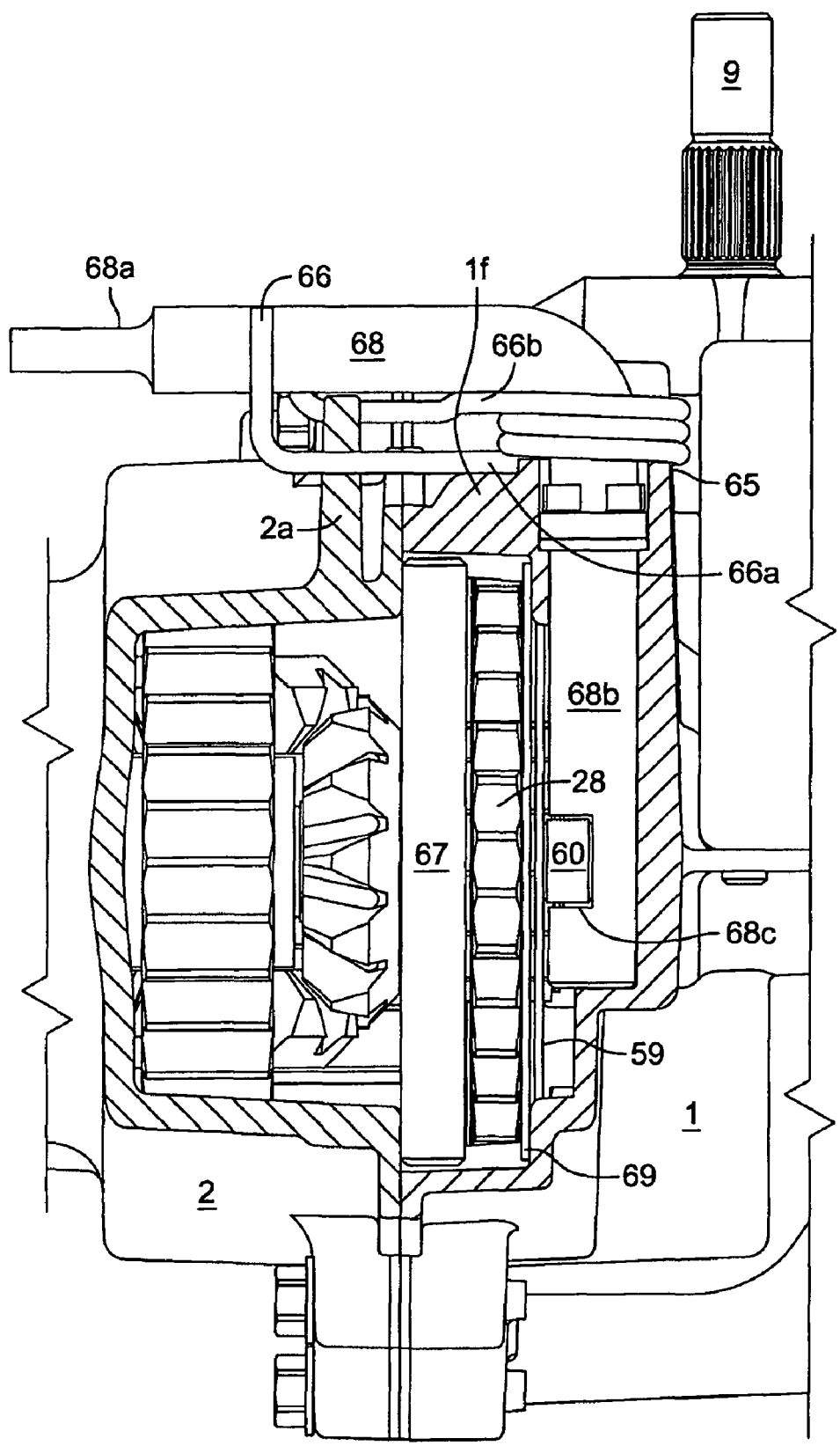
FIG. 7 is a cross-sectional view along the lines 7-7 of FIG. 4, with certain elements shown whole for clarity.

When brake arm 68 is rotated, puck 60 is moved to the left in FIG. 7, so that it frictionally engages brake rotor 59, which then moves to contact stator 69. This action places a frictional load on gear 28, as it is between stator 69 and pin 67, thus providing a braking force to gear 28. It will be understood that this design is generally intended to be used as a parking brake and not as a dynamic brake.

Figure 22:
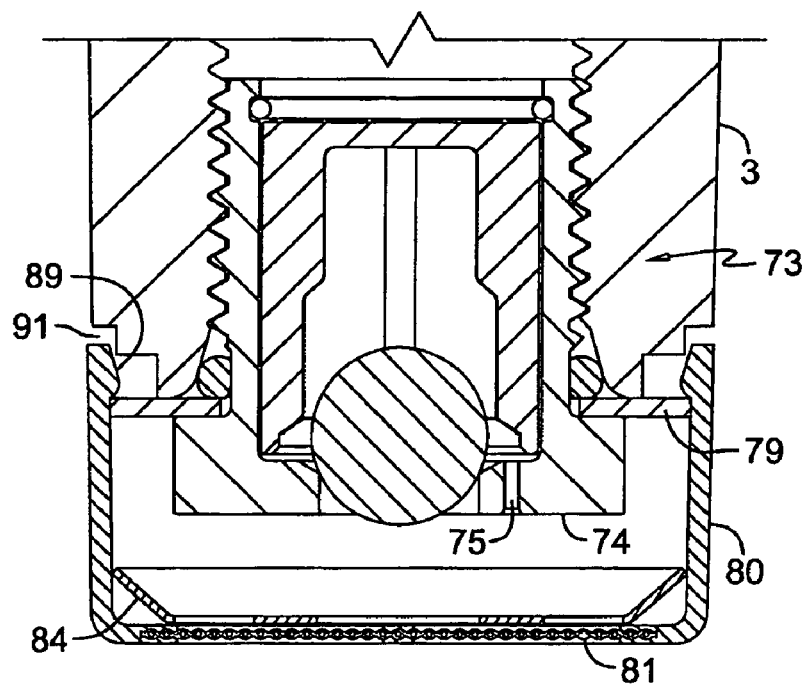
FIG. 22 is a cross-sectional view along the lines 22-22 in FIG. 8.
Figure 23:
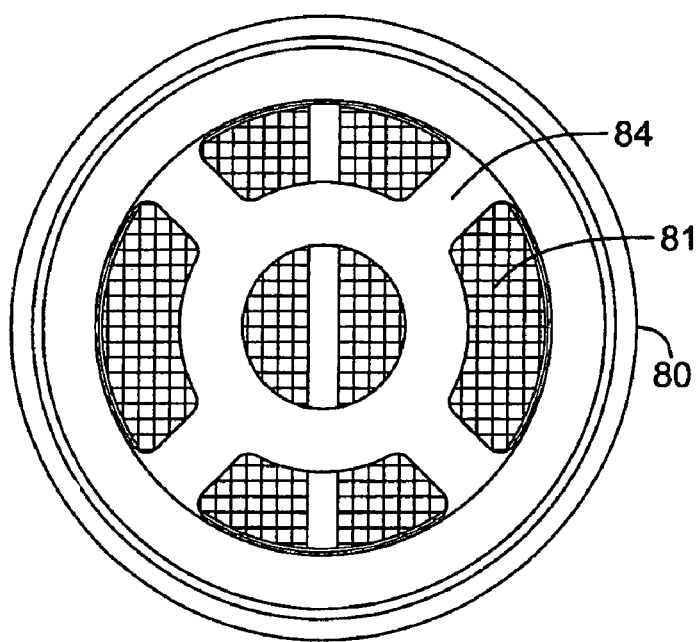
FIG. 23 is an interior view of the filter shown in FIG. 22.
Figure 24:
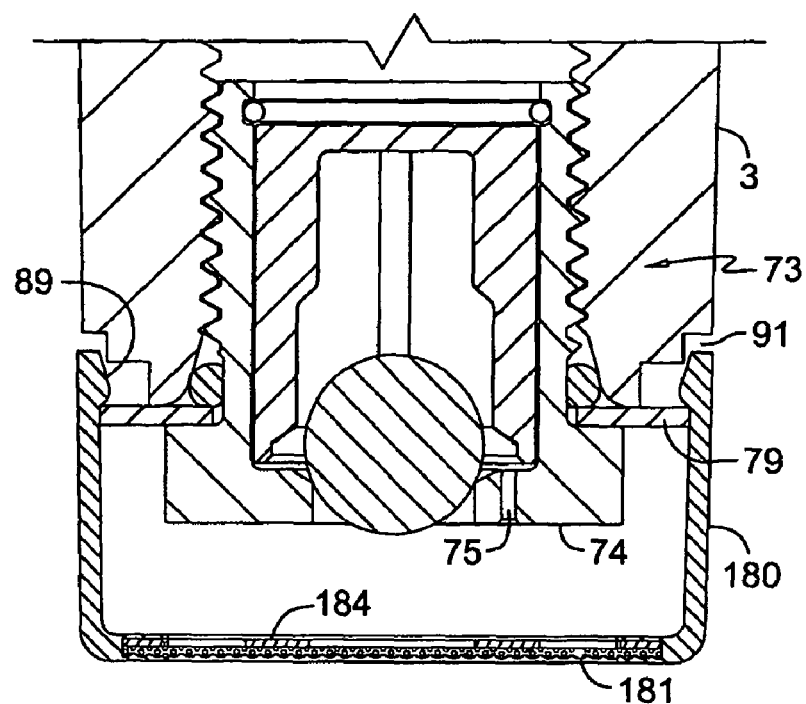
FIG. 24 is a cross-sectional view similar to that of FIG. 22 of an alternative filter embodiment.
Figure 25:
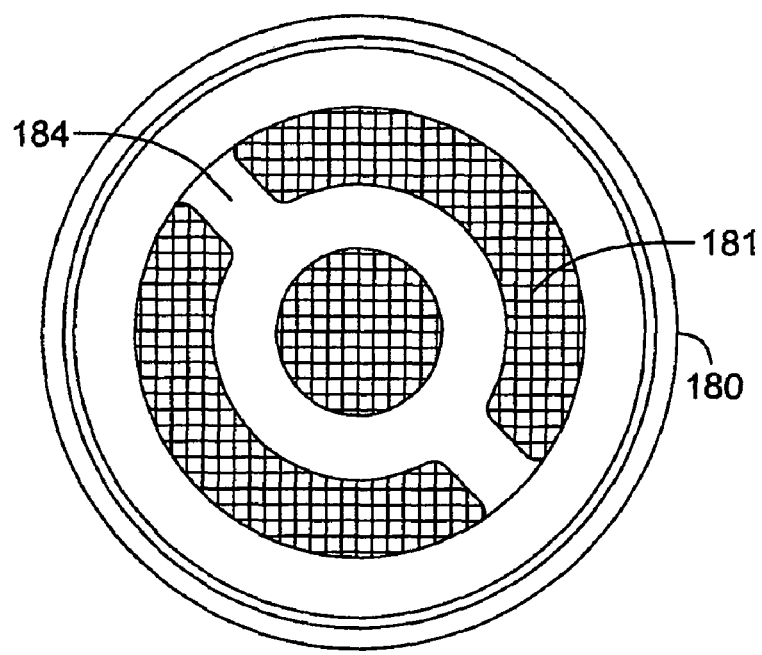
FIG. 25 is an interior view of the filter shown in FIG. 24.

It is generally known to have a filter housing secured to the bottom of a center section adjacent to the check valves to prevent contaminants from the common sump from entering the closed hydraulic circuit. One embodiment of the present invention provides for separate snap-on filters for each check valve. For example, a snap-on filter for connection to center section 3 is depicted in FIGS. 22 and 23. Specifically, check valve 73 is of a standard design and comprises a valve body 74 threaded into the bottom of center section 3 against washer 79. Filter housing 80 having a molded-in-place filter medium 81 is snapped onto washer 79 so that filter housing portion 89 grips washer 79. A clearance space 91 may need to be formed on center section 3 to allow filter housing 80 to be snapped onto washer 79. A push-in shield 84 is provided to prevent flow from check valve bleed 75 from piercing a hole in filter medium 81. A bleed shield 184 and filter medium 181 can both be molded into filter housing 180 directly, as depicted in FIGS. 24 and 25. Two check valves 73 are used in connection with such a hydrostatic transmission, so each will have its own filter housing and related assembly.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof. For example, the brake, swash plate, filter, gear train arrangement, bypass mechanism and other features disclosed herein may be used in conjunction with the other features shown herein or on their own in connection with another hydraulic apparatus design. Additional features and benefits of this invention are depicted in the figures.

The invention claimed is:

1. A drive apparatus, comprising:
   a motor shaft engaged to and driven by a motor;
   an output pinion gear disposed about and fixed on the motor shaft;
   a first axle shaft engaged to and driven by a drive gear; and
   a reduction gear set comprising a plurality of reduction gears disposed between the output pinion gear and the drive gear for transmitting rotating force from the motor shaft to the first axle shaft, wherein at least one of the plurality of reduction gears is rotatably disposed on the motor shaft and at least another of the plurality of reduction gears is rotatably disposed on the first axle shaft.

2. The drive apparatus of claim 1, further comprising:
   a second axle shaft engaged to and driven by the drive gear;

wherein the at least one of the plurality of reduction gears comprises a first stage gear disposed about and rotatably journalled on the first axle shaft, the first stage gear comprising a first set of outer gear teeth drivingly engaged to the output pinion gear and a first inner diameter gear form; and wherein the at least another of the plurality of reduction gears comprises a second pinion gear disposed about and rotatably journalled on the first axle shaft and drivingly engaged to the first inner diameter gear form; and wherein the reduction gear set further comprises:
- a second stage gear disposed about and rotatably journalled on the motor shaft, the second stage gear comprising a second set of outer gear teeth drivingly engaged to the second pinion gear and a second inner diameter gear form; and
- a third pinion gear disposed about and rotatably journalled on the motor shaft and drivingly engaged to the second inner diameter gear form;

wherein the drive gear comprises a differential bull gear drivingly engaged to the third pinion gear and a plurality of differential bevel gears engaged to the differential bull gear;

a first output bevel gear disposed about and fixed on an end of the first axle shaft and drivingly engaged to the plurality of differential bevel gears; and a second output bevel gear disposed about and fixed on an end of the second axle shaft and drivingly engaged to the plurality of differential bevel gears.

3. The drive apparatus of claim 2, further comprising a plurality of pins disposed in radially oriented bores formed in the differential bull gear, each pin supporting one of the plurality of differential bevel gears.

4. The drive apparatus of claim 2, further comprising a first set of bearings disposed between the second pinion gear and the first axle shaft and a second set of bearings disposed between the third pinion gear and the motor shaft.

5. The drive apparatus of claim 2, further comprising:
a stationary pin adjacent to a first face of the first stage gear;
a brake stator capable of bearing against the first stage gear and positioned on a second face of the first stage gear opposite the first face;
a brake rotor having an inner gear form engaging the teeth of the second pinion gear; and
a brake puck capable of bearing against the brake rotor.

6. The drive apparatus of claim 5, further comprising a brake arm having a cam pocket in which the brake puck is disposed.

7. A hydraulic drive apparatus, comprising:
a housing forming a hydraulic sump;
a hydraulic pump disposed in the housing;
a hydraulic motor disposed in the housing and driving a motor shaft;
an output pinion gear fixed on the motor shaft;
a first axle shaft having a first end extending from the housing and a second end engaged to and driven by a drive gear;
a first stage gear disposed about and rotatably journalled on the first axle shaft, the first stage gear comprising a first set of outer gear teeth drivingly engaged to the output pinion gear and a first inner diameter gear form;
a second pinion gear rotatably journalled on the first axle shaft and drivingly engaged to the first inner diameter gear form;
a second stage gear rotatably journalled on the motor shaft, the second stage gear comprising a second set of outer gear teeth drivingly engaged to the second pinion gear and a second inner diameter gear form; and
a third pinion gear rotatably journalled on the motor shaft and drivingly engaged to the second inner diameter gear form, and also drivingly engaged to the drive gear.

8. The hydraulic drive apparatus of claim 7, further comprising a first set of bearings disposed between the second pinion gear and the first axle shaft and a second set of bearings disposed between the third pinion gear and the motor shaft.

9. The hydraulic drive apparatus of claim 7, further comprising:
a stationary pin adjacent to a first face of the first stage gear;
a brake stator capable of bearing against the first stage gear and positioned on a second face of the first stage gear opposite the first face;
a brake rotor having an inner gear form that engages the teeth of the second pinion gear; and
a brake puck capable of bearing against the brake rotor.

10. The hydraulic drive apparatus of claim 9, further comprising a brake arm having a cam in which the brake puck is disposed.

11. The hydraulic drive apparatus of claim 7, further comprising a center section having a first running surface for the hydraulic motor on one side thereof and a thrust spacer mounted on a side of the center section opposite the first running surface.

12. The hydraulic drive apparatus of claim 11, wherein the thrust spacer comprises arms disposed about a portion of the circumference of the output pinion gear, wherein the arms clear the teeth of the output pinion gear and are adjacent to and capable of engaging the first stage gear in the event of thrust of the first stage gear toward the output pinion gear.

13. The hydraulic drive apparatus of claim 11, wherein the thrust spacer is comprised of a spacer cup having a circular cup wall, the spacer cup being mounted to the center section, wherein the output pinion gear is located in an internal volume of the spacer cup and openings are formed in the circular cup wall to permit oil flow from the sump into and out from the internal volume of the spacer cup and to provide an area for the output pinion gear to engage with the first stage gear.

14. The hydraulic drive apparatus of claim 13, wherein the spacer cup further comprises a first flange and a second flange, the first flange being shaped to fit within pockets formed on the center section to prevent rotation of the spacer cup with respect to the center section and the second flange abutting against a washer adjacent to the first stage gear.

15. The hydraulic drive apparatus of claim 11, further comprising a pump input shaft rotatably driving a pump cylinder block adjacent to a second running surface for the hydraulic pump formed on the center section and hydraulic porting in the center section to connect the hydraulic motor to the hydraulic pump.

16. The hydraulic drive apparatus of claim 7, further comprising a second axle shaft having a first end extending from the housing and a second end engaged to the drive gear, wherein the drive gear comprises a differential bull gear.

17. The hydraulic drive apparatus of claim 16, further comprising:
a plurality of differential bevel gears engaged to the differential bull gear;
a first output bevel gear fixed on one end of the first axle shaft and drivingly engaged to the plurality of differential bevel gears; and
a second output bevel gear fixed on one end of the second axle shaft, and drivingly engaged to the plurality of differential bevel gears.

18. The hydraulic drive apparatus of claim 17, further comprising a plurality of pins in radially oriented bores formed in the differential bull gear, each pin supporting one of the plurality of differential bevel gears.

19. A drive apparatus, comprising:
a housing;
a pump and a motor connected to the pump;
a motor shaft engaged to and driven by the motor;
an output pinion gear fixed on the motor shaft;
a differential gear drive disposed in the housing;
a first axle shaft having a first end engaged to and driven by the differential gear drive and a second end extending from a first side of the housing;
a second axle shaft having a first end engaged to and driven by the differential gear drive and a second end extending from a second side of the housing opposite the first side;
a reduction gear set comprising a plurality of reduction gears disposed between the output pinion gear and the differential gear drive for transmitting rotating force from the motor shaft to the first axle shaft and the second axle shaft, wherein at least one of the plurality of reduction gears is rotatably disposed on the motor shaft.

20. The drive apparatus of claim 19, wherein at least two of the plurality of reduction gears are rotatably disposed on the motor shaft and at least two of the plurality of reduction gears have an axis of rotation that is coaxial with the axis of rotation of the first axle shaft and the second axle shaft.

21. The drive apparatus of claim 19, further comprising a center section comprising a motor running surface on a first side thereof and a thrust spacer mounted on a second side of the center section opposite the motor running surface.

22. The drive apparatus of claim 21, wherein the thrust spacer has arms disposed about a portion of the circumference of the output pinion gear, wherein the arms clear the teeth of the output pinion gear and are adjacent to and capable of engaging one of the plurality of reduction gears to prevent contact between said one of the plurality of reduction gears and the output pinion gear.

23. The drive apparatus of claim 21, wherein the thrust spacer is comprised of a spacer cup having a circular cup wall, the spacer cup being mounted to the center section, wherein the output pinion gear is located in an internal volume of the spacer cup and openings are formed in the circular cup wall to permit oil flow from a sump formed in the housing into and out from the internal volume of the spacer cup and to provide an area for the output pinion gear to engage with one of the plurality of reduction gears.

24. The drive apparatus of claim 23, wherein the spacer cup further comprises a first flange and a second flange, the first flange being shaped to fit within pockets formed on the center section to prevent rotation of the spacer cup with respect to the center section and the second flange abutting against a washer adjacent to one of the plurality of reduction gears.

* * * * *